UNITED STATES PATENT OFFICE.

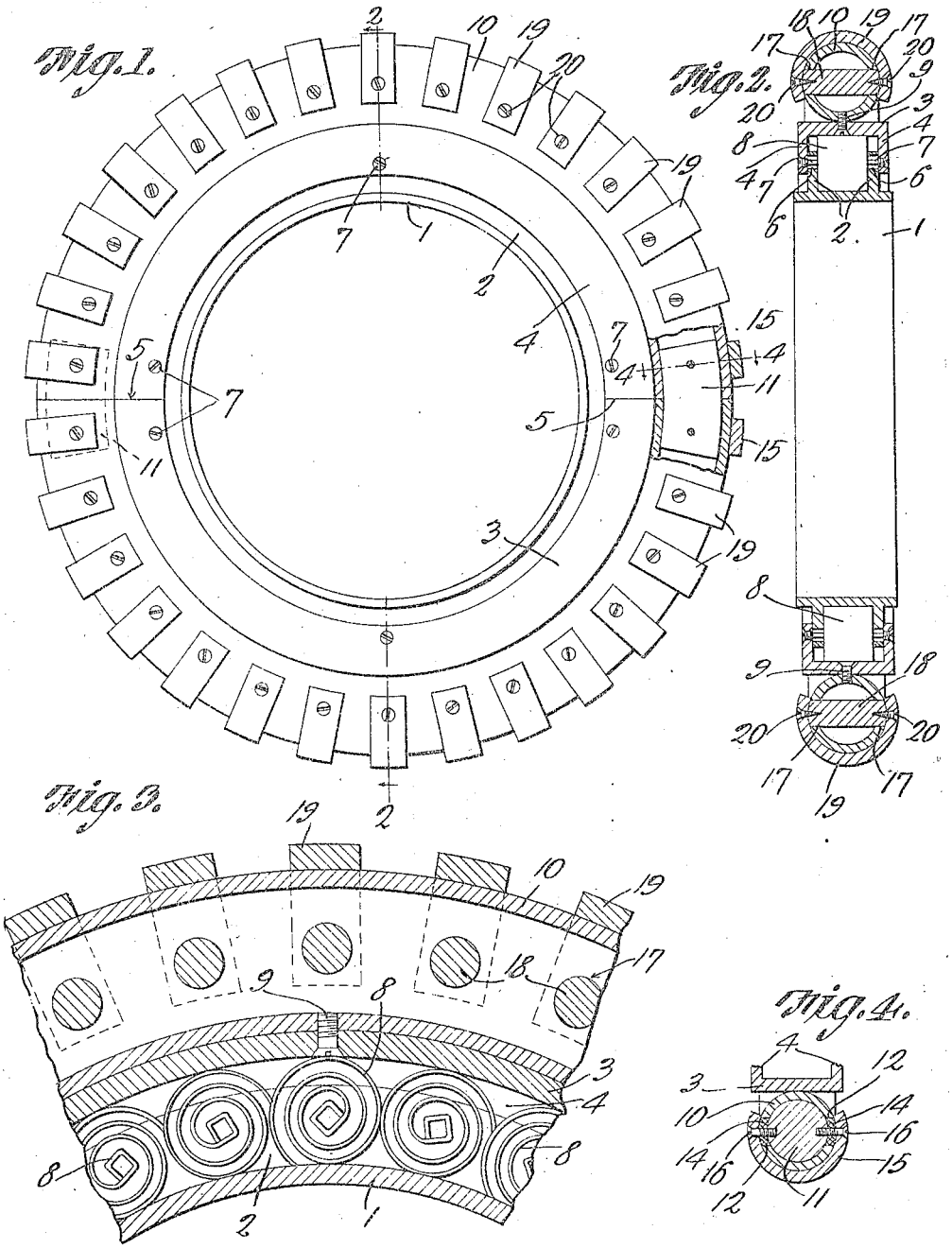

GEORGE LOFFI, OF GARRETT, INDIANA, ASSIGNOR OF FORTY-FIVE ONE-HUNDREDTHS TO FRANK E. FLUKE, OF GARRETT, INDIANA.

AUTO-TIRE.

1,220,653.  Specification of Letters Patent. Patented Mar. 27, 1917.

Application filed December 16, 1915. Serial No. 67,214.

*To all whom it may concern:*

Be it known that I, GEORGE LOFFI, a citizen of the United States, residing at Garrett, in the county of Dekalb and State of Indiana, have invented a new and useful Auto-Tire, of which the following is a specification.

The device forming the subject matter of this application is a wheel, and one object of the invention is to provide a device of this type in which pneumatic elements, subject to puncture, may be dispensed with.

Another object of the invention is to improve the tire construction.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed, without departing from the spirit of the invention.

In the accompanying drawing:—

Figure 1 shows in side elevation, a wheel constructed in accordance with the present invention, parts being broken away;

Fig. 2 is a cross section on the line 2—2 of Fig. 1;

Fig. 3 is a fragmental longitudinal section, wherein parts appear in elevation;

Fig. 4 is a cross section on the line 4—4 of Fig. 1.

In carrying out the present invention there is provided a trough-shaped inner rim 1 embodying side flanges 2 and preferably made of metal. The invention further includes a trough-shaped outer rim 3, also made of metal, and embodying side flanges 4, the side flanges 4 of the outer rim being overlapped upon the side flanges 2 of the inner rim 1, in a manner which will be obvious from Fig. 2 of the drawing. The outer rim 3 preferably consists of two parts, the lines of division between these parts of the outer rim being indicated by the reference character 5. In the side flanges 2 of the inner rim 1, enlarged openings 6 are formed, the same being adapted to receive projections 7, preferably screws, mounted in the side flanges 4 of the outer rim 3, the inner ends of the projections 7 being received somewhat loosely in the openings 6, so that the outer rim 3 may move radially with respect to the inner rim 1 and have a slight circumferential movement with respect thereto, the construction being such that an excessive creeping of the outer rim 3 with respect to the inner rim 1 will be avoided.

Interposed between the inner rim 1 and the outer rim 3 are free coiled springs 8 which preferably are in contact with each other. The springs 8 are mounted to roll circumferentially of the wheel to a limited extent. The springs 8 are disposed in pairs and the springs of the several pairs are oppositely wound, so that the ends of the springs of the pairs will not interlock with each other as the springs roll.

By means of securing elements 9, tread sections 10 are secured to the constituent members of the outer rim, these tread sections 10 preferably being made of metal and being of tubular form. The ends of the tread sections 10 are connected by plugs 11 which may be made of wood or any other material. In the tread sections 10 near to their ends, holes 12 are formed and in the holes 12 are mounted fillers 14 which may be made of wood, fiber, leather or any other suitable material.

Transverse tread strips 15 ordinarily made of rubber or a rubber compound, extend transversely of the tread sections 10 adjacent their ends, and house the fillers 14. Securing elements 16, which may be screws, pass through the ends of the tread strips 15, through the fillers 14 and enter the ends of the plugs 11. Thus, by a single set of securing elements, the tread strips 15 which are located adjacent the ends of the tread sections 10 are held thereon and, at the same time, the ends of the plugs 11 are secured to the respective tread sections 10.

Intermediate their ends, the tubular tread sections 10 are provided with opposed openings 17 in which are mounted the ends of cross members 18 which may be made of wood. Tread strips 19 extend transversely of the tread sections 10 and overlap the ends of the cross members 18. Securing elements 20 pass through the ends of the tread strips 19 and enter the ends of the cross members 18.

Especial attention is directed to the fact that the coiled springs 8 are adapted to roll between the inner rim 1 and the outer rim 3, to a slight extent when relative circumferential movement between the inner rim 1 and the outer rim 3 takes place, it being observed that the openings 6 in the side flanges 2 of the inner rim 1 are large enough to permit such a movement without, however, permitting the outer rim to creep unduly with respect to the inner rim. Since the coiled springs 8 are free to roll to a slight extent, the successive portions of the springs will be presented to receive the pressure, the life of the springs being increased accordingly.

Having thus described the invention, what is claimed is:—

1. In a device of the class described, a tire composed of tubular members having openings in their sides; a plug inserted into the ends of the tubular members; fillers in the openings; tread strips extended transversely of the tubular members and overlapped upon the fillers; and securing devices passing through the tread strips and through the fillers, and entering the plug.

2. In a device of the class described, a tire comprising tubular members provided with openings in their sides; a plug having its ends mounted in the ends of the tubular members; tread strips applied to the tubular members and overlapped upon the openings; and securing devices passing through the tread strips and through the openings and entering the plug.

3. In a device of the class described, a tire comprising a tubular member having opposed openings; a cross member having its ends mounted in the openings; a tread strip having its ends overlapped upon the ends of the cross member; and securing devices passing through the tread strip and entering the ends of the cross member.

In testimony that I claim the foregoing as my own, I have hereto affixed my signature in the presence of two witnesses.

GEORGE LOFFI.

Witnesses:
  G. W. SPENCER,
  C. H. HEINZERLING.